(12) United States Patent
Kamar et al.

(10) Patent No.: US 7,996,338 B2
(45) Date of Patent: Aug. 9, 2011

(54) COMBINING PREDICTIVE MODELS OF FORGETTING, RELEVANCE, AND COST OF INTERRUPTION TO GUIDE AUTOMATED REMINDING

(75) Inventors: Semiha Ece Kamar, Cambridge, MA (US); Eric J. Horvitz, Kirkland, WA (US)

(73) Assignee: Mircrosoft Corporation, Redmond, WA (US)

( * ) Notice: Subject to any disclaimer, the term of this patent is extended or adjusted under 35 U.S.C. 154(b) by 628 days.

(21) Appl. No.: 12/163,045

(22) Filed: Jun. 27, 2008

(65) Prior Publication Data

US 2009/0327169 A1    Dec. 31, 2009

(51) Int. Cl.
*G06N 5/00* (2006.01)

(52) U.S. Cl. .......................... 706/11; 706/45

(58) Field of Classification Search .............. 706/11, 706/45
See application file for complete search history.

(56) References Cited

U.S. PATENT DOCUMENTS

| | | | |
|---|---|---|---|
| 6,604,059 | B2 | 8/2003 | Strubbe et al. |
| 7,107,491 | B2 | 9/2006 | Graichen et al. |
| 7,209,916 | B1 | 4/2007 | Seshadri et al. |
| 7,212,827 | B1 | 5/2007 | Veschl |
| 7,249,159 | B1 | 7/2007 | Horvitz et al. |
| 2004/0177053 | A1 | 9/2004 | Donoho et al. |
| 2006/0190440 | A1 | 8/2006 | Horvitz et al. |
| 2008/0005055 | A1 | 1/2008 | Horvitz |

FOREIGN PATENT DOCUMENTS

WO    WO2005096147 A1    10/2005

OTHER PUBLICATIONS

Beaudoin, Goal Processing in Autonomous Agents, Doctoral Thesis, School of Computer Science, University of Birmingham, Aug. 1994, pp. 1-178.*

Shailad Sen, et. al. FeedMe: A Collaborative Alert Filtering System. CSCW'06, Nov. 4-8, 2006, Banff, Alberta, Canada. ACM-i-59593-249-6/06/0011. http://www.shilad.com/papers/feedme_paper.pdf, Last accessed Jan. 9, 2008, 10 pages.

Eric Horvitz, et.al. Learning and Reasoning about Interruption. ICMI'03, Nov. 5-7, 2003, Vancouver. ACM-1-58113-621-8/03/0011. http://research.microsoft.com/~horvitz/iw.pdf. Last accessed Jan. 9, 2008, 9 pages.

Eric Horvitz, et. al. Models of Attention in Computing and Communication: From Principles to Applications. http://research.microsoft.com/~horvitz/cacm-attention.pdf. Last accessed Jan. 9, 2008, 12 pages.

Anind K. Dey, et. al. CybreMinder: A Context-Aware System for Supporting Reminders. http://www.cc.gatech.edu/projects/infosphere/papers/CybreMinder.pdf. Last accessed Jan. 10, 2008, 15 pages.

* cited by examiner

*Primary Examiner* — Wilbert L Starks, Jr.
(74) *Attorney, Agent, or Firm* — Lee & Hayes, PLLC

(57) ABSTRACT

The claimed matter provides systems and/or techniques that develop or use predictive models of human forgetting to effectuate automated reminding. The system includes the use of predictive models that infer the probability that aspects of items will be forgotten, models that evaluate the relevance of recalling aspects of items in different settings, based on contextual information related to user attributes associated with the items, and models of the context-sensitive cost of interrupting users with reminders. The system can combine the probability of users forgetting aspects of an item with an assessed cost of forgetting those aspects to ascertain expected costs for not being reminded about events, compare expected costs for not being reminded with expected costs for interrupting users, and based on comparisons between expected costs for being reminded and expected costs for interrupting users regarding events, generate and deliver reminder notifications to users about items.

20 Claims, 9 Drawing Sheets

COMBINING PREDICTIVE MODELS OF FORGETTING, RELEVANCE, AND COST OF INTERRUPTION TO GUIDE AUTOMATED REMINDING

BACKGROUND

It is well known that individuals tend to forget about such items as tasks, locations, names, and events with regularity. One approach to reminding people about items that that they might forget is to employ automated reminding systems that alert users. For example, online calendaring systems often provide services for alerting people about pending appointments. In the real world, there are many categories of events that may be forgotten, beyond appointments and it can be a challenge to inform a system about events that may be forgotten. Further, it can be a challenge to understand the times, and, more generally, the contexts, when information that might likely be forgotten might be relevant. In addition, sending people reminders about items that might be forgotten can be costly. People can be overwhelmed with a multitude of notifications and messages emitted from portable and desktop computing systems and applications that have as their ostensible impetus and purported objective the making of daily life easier and more tolerable. Nonetheless, this unceasing flurry of notification has left most individuals overworked and frustrated with the cognitive load of interruptions and notifications. Recent studies have revealed that an average user or individual can receive several notifications every hour from a multitude of sources (e.g., e-mail, personal information managers, etc.). Furthermore, it has also been revealed that each notification can require significant amounts of time to recover once the individual has addressed and/or dispatched the issue associated with a notification (e.g., to regain one's thoughts and re-focus on the task at hand). Clearly, where an individual receives scores of notifications and/or reminders every hour and if, as has been posited, it can take significant amounts of time to realign or reorient one's cognition back to an interrupted task after a disruption, there can be insufficient hours in a day in which to complete one's own assignments and tasks.

The subject matter as claimed therefore is directed toward the automated assistance with the recall of information that may be forgotten, while addressing the challenges of predicting forgetting, identifying relevance of information, and the cost of interruption associated with reminders, even when the reminders are overall valuable.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

While reminders can be very useful, they nevertheless can be disruptive. The subject matter as claimed provides better prediction of forgetting, relevance of information to a context, and cost of interruption, so as to filter and schedule reminders, so as to maximize the benefits and minimize the disruptive effects of reminders. The matter as claimed and disclosed herein provides intelligent notifications by simultaneously considering models of user's memory, interruption costs, relevance of the reminder, and/or ideal timing of the reminder based on contextual information.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
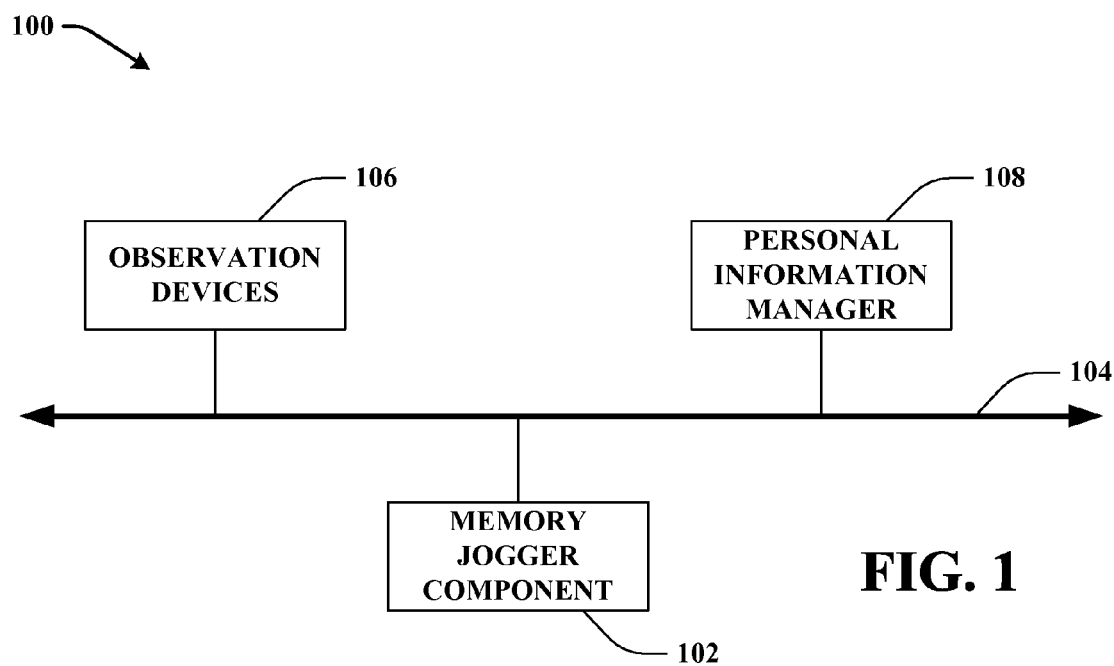
FIG. 1 illustrates a machine-implemented system that develops and/or employs predictive models of human memory to facilitate and effectuate automated reminding in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Common experiences coupled with observations about the extensive use of hardcopy notes, to-do lists, and computer-based reminder systems demonstrates that people forget about their tasks with great frequency. Computing devices are growing in popularity as aids to assist in remembering and recalling of tasks, appointments, important dates, locations, and names. Nevertheless, with many items and their associated reminders spawning and creating messages and notifications, people can become overwhelmed with the cognitive workload placed upon them by interruptions and notifications. Although notifications can be useful and/or beneficial, these notifications are nonetheless often disruptive and can adversely and deleteriously affect cognitive workload. Accordingly, the subject matter disclosed and claimed herein provides improved filtering and scheduling of notifications and reminders in order to minimize or mitigate their disruptive effects without reducing the benefits of receiving such appropriate and timely notification and reminder.

The subject matter as claimed provides a design for a context-aware reminder system that can work as a personal filter that decides which reminders are more useful to the individual than being disruptive to the individual. The claimed subject matter utilizes probabilistic models to model the user and predict the expected value of a reminder. As part of the effective delivery of potentially valuable reminders, the matter as claimed creates personal automated computational agents that can mediate if and when notifications should be delivered to users, and in so doing, utilizes predictive components that simultaneously estimate the costs associated with interruption, predict the relevance of received reminders, predict the ability or inability of users to overall recall items without a reminder, and/or predict the ability or inability of users to recollect different levels of detail or aspects of the items. Additionally, the claimed subject matter can reason about the ideal timing for delivering a reminder, taking into consideration one or more bits of contextual information. For example, an analysis of the ideal timing of a relevant reminder about the details of the location of a meeting at a distance away from a user can consider information about the current and future traffic flows on roads between the current location and the target location in order to better schedule the dispatch of reminder notifications.

Reminders can be useful to refresh an individual's memory about upcoming and/or impending events. A reminder can have associated therewith high level information to remind the individual that the event exists (e.g., title and start time) or can provide details including estimated travel time, estimated departure time, and/or directions. Reminder notifications nevertheless can cause disruption depending on the interruptibility level of the individual and therefore can produce interruption. The magnitude of the cost of interruption can depend on the current attention and cognitive load of the individual. A notification is useful if the benefit of the notification is higher than the interruption costs. Typically, one can estimate the value of a reminder by subtracting the benefit of notification from the interruption costs, and sending a reminder if the net value is estimated to be positive.

While the claimed subject matter focuses on and is explicated in terms of event domains, it will be appreciated by those ordinarily cognizant in this field of endeavor that the matter as disclosed and claimed herein can find applicability or utility in other contexts of daily human enterprise, and in particular, can be extended to other reminder settings. A reminder for an event or other items that may have been forgotten (e.g., tasks that need to be completed, the names of people attending a party that might likely be forgotten, etc.) is beneficial if the item is actually relevant to the user in current or forthcoming contexts. For example, a reminder about the existence of a forthcoming meeting and/or the details about the event or item such as the location, topic, and attendees of the meeting might be most relevant if the user wishes to attend the event. A user can have a long list of potentially forgotten items or events with only a few events or items that are of particular interest to the user in a current or forthcoming setting. Thus, a relevance value can be utilized to aid in filtering relevant events from irrelevant ones. Accordingly, the following discussion focuses, without limitation, on events such as appointments and meetings, but the reasoning and analysis set forth herein can apply in a straightforward manner to other items that may be forgotten.

In order to facilitate the integration of models of the relevance of information in a setting, one can assume that a meeting is relevant if a user will attend the meeting. The probability of attending $p(A|E)$ an event (m) can be conditioned on some observational evidence E. The probability of attending $p(A|E)$ can be estimated through use of a probabilistic model that predicts attendance.

Events typically are not equally prioritized in a particular user's schedule. One can consider events to be of a priority that reflects the cost of missing an event, with low priority events being associated by users with a low cost of missing an event and high-priority events being associated by users with a high cost of missing the event. The priority of an event can be predicted through use of a probabilistic model that takes into consideration properties of the event as observational evidence. Further, a predictive model can be employed to predict the expected cost of interruption (ECI) of a user in a setting, based on observational evidence about the setting. If the ECI is high for a current state, the user may prefer not to be reminded of a low priority event although she or he would be willing to be reminded for a high priority event. The claimed subject matter provides a probabilistic model for inferring a probability distribution over the potential priorities of events. Thus, for any given event m, in accordance with an aspect, the claimed subject matter predicts the probability that m has high priority $p(m^H)$, medium priority $p(m^M)$, and low priority $p(m^L)$.

Events or other items are not simply forgotten versus remembered. Rather they can be recalled with different degrees of fidelity. For simplicity of illustration rather limitation, assume that the state of an individual's memory about an event or other item can reside in one of three permissible states. Where the user has entirely forgotten that the event or item even exists, the user can be classified as being in a "Forget All" state (FA), where the user remembers that the event or item exists but nonetheless cannot remember details, such as location or time of the event or item, such a user can be categorized as being in a "Forget Details" state (FD), and where the user remembers everything about the item or event, such a user can be designated as being in a "Remember" state (R). Based at least in part on these assumptions, the matter as disclosed and claimed herein can collect user annotated data about an individual's memory states with regard to previous items or events (e.g., in the form of training data) and can utilize this data to generate memory probabilistic models that can predict or infer $p(FA|E)$, $p(FD|E)$, $p(R|E)$ probabilities given observational evidence E. Once again solely for purposes of exposition rather than limitation, memory states FA, FD, and R can be considered mutually exclusive and collectively exhaustive, therefore the probability that a user will remember everything about a event given observational evidence E can be represented by $p(R|E)=1-p(FA|E)-p(FD|E)$.

Further, again for purposes elucidation rather than limitation, expected utility values for reminding at any of the three illustrative memory states can be represented as follows. In expected utility determination one can follow the principles of expected utility decision making to ascertain the Expected Utility of Reminding (EUR). For example, individuals can be requested to evaluate the value of time for three possible cases; a minute cost for being late to high, medium, low priority events, represented as $c_{Late}^H$, $c_{Late}^M$, and/or $c_{Late}^L$; total cost for not attending a high, medium, low priority event, denoted as $C_{NA}^H$, $C_{NA}^M$ and/or $C_{NA}^L$; and the minute cost for being early, c. These values can represent the individual's willingness to pay in monetary terms for not being in one of the aforementioned situations or states. These user costs can then be combined with the probability of being in associated states to form the Expected Utility of Reminding (EUR) equation:

$$EUR = p(FA|E)U_R(FA) + p(FD|E)U_R(FD) + p(R|E)U_R(R) \quad (1)$$

where $U_R(FA)$, $U_R(FD)$, and $U_R(R)$ represent the estimated utility of being reminded at states FA, FD, and/or R, respectively.

Moreover, solely for purposes of exposition rather than limitation, for utility determination the following assumptions and associated formulations can be employed by the matter disclosed and claimed herein: if a event is relevant to the user then the user can be in the "Remember" state (R) and the user will typically be on time; if the user is on time, the utility of reminding the user to be on time ($U_{OnTime}$) can be 0 (e.g., there is no point reminding the user about an event that he or she is, or will be, on time for). The estimated utility of being reminded in this state can be computed as:

$$U_R(R) = (p(A|E)(U_{OnTime} - U_{OT})) - ECI \quad (2)$$

Where the user has forgotten pertinent details regarding the event (e.g., event time, event location, etc.) the user can be categorized as being in the "Forgot Details" state (FD) and as such the user can be late by t minutes, with the corresponding estimated utility of being reminded being: $U_{Late} = -Cost_{Late}$ impending and/or approaching items or events, system 100 can predict, ascertain, and/or infer a user's probability for forgetting about an item or event, combine the user's probability for forgetting about the event or item with user specific criteria and/or costs to estimate or ascertain a cost associated with not being reminded of the item or event. System 100 can deliberate or balance between the cost for not being reminded versus the cost of interrupting the user from his or her current tasks. Based at least in part on the decision, inference, and/or deliberation made, system 100 can distribute or deliver (e.g., via email) a reminder notification to the user (e.g., if system 100 ascertains that the cost of not being reminded outweighs the cost of interruption). It should be noted that system 100 can continuously, automatically, and/or dynamically adjust itself according to feedback, or lack thereof, received about the successes or failures of system 100.

As depicted, system 100 can include memory jogger component 102; an event monitoring structure that can receive various and varied input and that generates and utilizes Expected Utility of Reminding (EUR) determinations to disseminate or refrain from disseminating notifications to individual users of the system 100 based at least in part on inputs elicited, generated, ascertained, and/or acquired. Memory jogger component 102 can be in continuous and/or operative or sporadic and/or intermittent communications with observation devices 106 and/or personal information manager 108 via network topology or cloud 104.

As illustrated, memory jogger component 102 can be implemented entirely in hardware and/or a combination of hardware and/or software in execution. Further, memory jogger component 102 can be incorporated within and/or associated with other compatible components. Additionally, memory jogger component 102 can be any type of machine that includes a processor and/or is capable of effective communications with network topology or cloud 104. Illustrative machines that can comprise memory jogger component 102 can include cell phones, smart phones, laptop computers, notebook computers, Tablet PCs, consumer and/or industrial devices and/or appliances, hand-held devices, personal digital assistants, server class machines and computing devices and/or databases, multimedia Internet enabled mobile phones, multimedia players, automotive components, avionics components, and the like.

Network topology or cloud 104 can include any viable communication and/or broadcast technology, for example, wired and/or wireless modalities and/or $$U_R(FD) = (p(A|E)(U_{OnTime} - U_{Late})) - ECI \quad (3)$$
$$= (p(A|E)(-c_{Late}t)) - ECI \quad (4)$$

where $$c_{Late} = p(m^H)c_{Late}^H + p(m^M)c_{Late}^M + p(m^L)c_{Late}^L \quad (5)$$

Where the user has forgotten entirely about the event (e.g., is in the "Forget All" state), the user will typically miss the whole event and the estimated utility of being reminded can be represented as: $U_{NA} = -Cost_{NA}$ $$U_R(FA) = (p(A|E)(U_{OnTime} - U_{NA})) - ECI \quad (6)$$
$$= (p(A|E)(-c_{NA})) - ECI \quad (7)$$

where $$c_{NA} = p(m^H)c_{NA}^H + p(m^M)c_{NA}^M + p(m^L)c_{NA}^L \quad (8)$$

Accordingly, the Expected Utility of Reminding (EUR) can be represented by:

$$EUR = p(A|E)(p(FA|E)c_{NA} + p(FD|E)c_{Late}t) - ECI \quad (9)$$

It should be noted in regard to the above formulations that ECI refers to the Expected Cost of Interruption (ECI).

Turning now to FIG. 1 that depicts a system 100 that utilizes predictive models of human memory to facilitate and effectuate automated reminding in accordance with an aspect of the claimed subject matter. As a preliminary but extremely cursory overview, system 100 can acquire or receive impending or approaching events or items gleaned, for example, from a personal information manager and thereafter can evaluate the incoming events or items for relevance through use of a user's self assessments about event attendance, for instance. Through utilization of contextual information and attributes associated with technologies can be utilized to effectuate the claimed subject matter. Moreover, network topology and/or cloud 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof. Additionally, network topology and/or cloud 104 can include or encompass communications or interchange utilizing Near-Field Communications (NFC) and/or communications utilizing electrical conductance through the human skin, for example.

Observation devices 106 can provide much contextual information regarding a user's activities or inactivity, for example, low-level and high-level actions performed by the user, such as whether the user is typing or using the mouse, the current focus of the user, how frequently the user switches between applications, how many applications are visited, the time periods during which the user is active or inactive, for instance. Observation devices 106 therefore can include a multitude of various devices that can be in continuous and/or operative or sporadic and/or intermittent communication with memory jogger component 102 and/or personal information manager 108 through network topology or cloud 104. Like memory jogger component 102, observation devices 106 can be implemented entirely in hardware and/or as a combination of hardware and/or software in execution. Moreover observation devices 106 can include any type of engine, machine, instrument of conversion, or mode of production that includes a processor and/or is capable of effective and operative communication with network topology or cloud 104. Illustrative instruments of conversion, modes of production, engines, mechanisms, devices, and/or machinery that can comprise observation devices 106 can include desktop computers, server class computing devices and/or databases, cell phones, smart phones, laptops, note book computers, Tablet PCs, consumer and/or industrial devices and/or appliances and/or processes, hand-held devices, personal digital assistants, multimedia Internet enabled mobile phones, or multimedia players. Observation devices 106 can also include microphones, motion detectors, heat sensors, video cameras, keyboards, mouse, biometric feedback components, and the like, that can be standalone items and/or affiliated or confederated with the aforementioned and/or enumerated instruments of conversion, modes of production, engines, mechanisms, devices, etc.

Personal information manager 108 can include task and content management, note taking, journaling features, Web browsing, and/or calendaring functionalities. Similar to memory jogger component 102 and observation devices 106, personal information manager 108 can be implemented entirely in hardware and/or as a combination of hardware and/or software in execution. Further, personal information manager 108 can be any type of mechanism, machine, device, facility, and/or instrument that includes a processor and/or is capable of effective and/or operative communication with network topology or cloud 104. Mechanisms, machines, devices, facilities and/or instruments that can comprise personal information manager 108 can include Tablet PCs, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, automotive components, satellites and/or satellite equipment, and the like.

Figure 2:
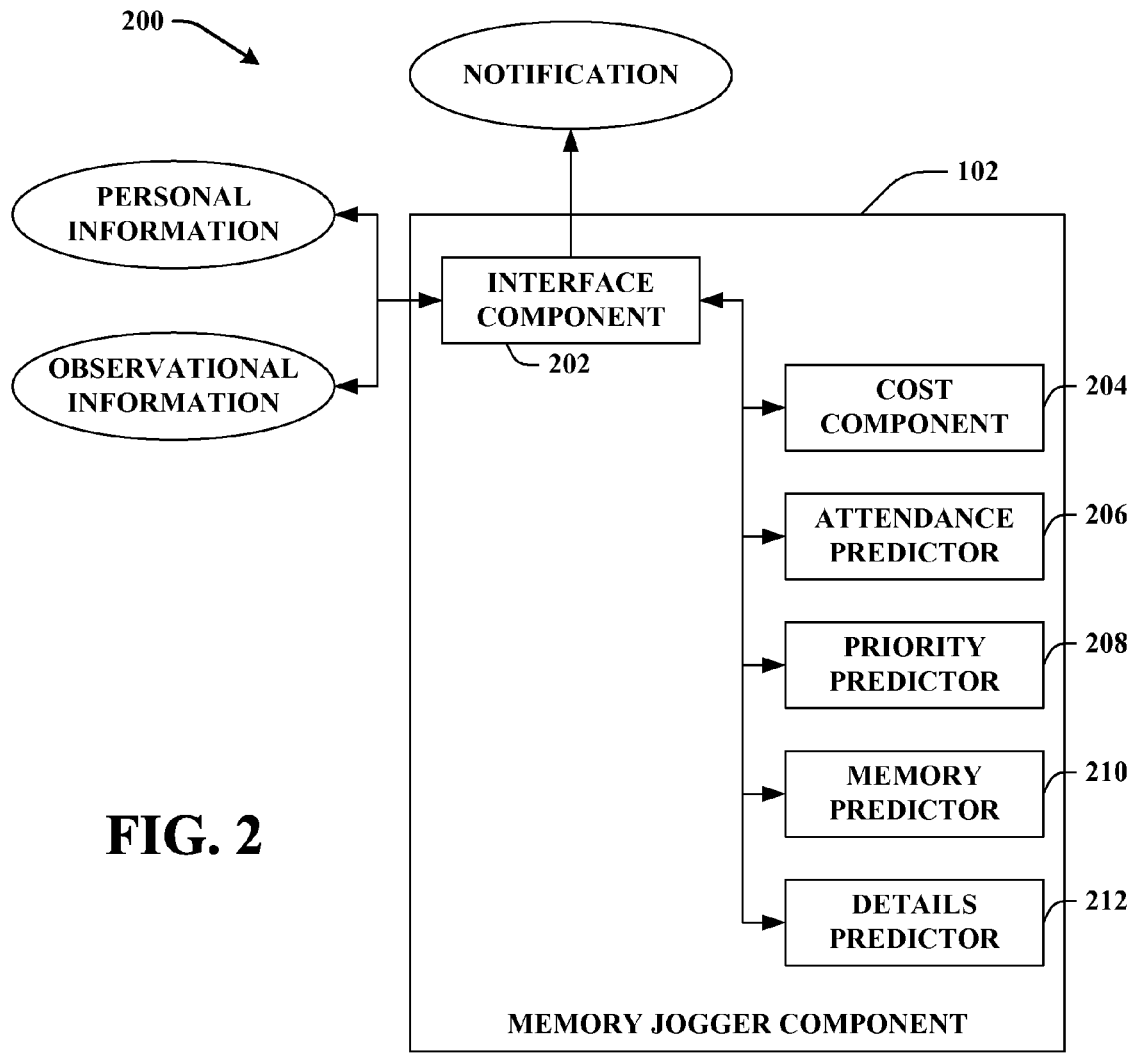
FIG. 2 provides a more detailed depiction of a machine-implemented memory jogger component that constructs and/or utilizes predictive models of human memory to facilitate and effectuate automated reminding in accordance with an aspect of the claimed subject matter.

FIG. 2 provides a more detailed depiction 200 of memory jogger component 102 in accordance with an aspect of the claimed subject matter. As illustrated memory jogger component 102 can actively or passively receive and/or acquire input such as, for example, lists of events or items (e.g., calendar events such as meetings, appointments, scheduled sporting events, concerts, recitals, etc.) from personal information manager 108. The lists of items or events (e.g., appointments, meetings, and the like) can be tentative or can have been accepted by the user. Additionally, each item or event can include other item or event attributes, such as time, location, and possible attendees to the events, for example. In order to generate and to be able to utilize viable and useful predictive models, memory jogger component 102 can also gather contextual information from observational sources such as observation devices 106. For example, observation devices 106 can supply information related to low level and/or high level actions performed by the user as well as contextual data such as whether there is an ongoing conversation (e.g., telephone conversation) in the user's office and the predicted duration of the detected conversation. These inputs can then be fed into components and/or aspects of the matter disclosed and claimed herein and/or combined with user specific costs to evaluate the overall benefit (e.g. Expected Utility of Reminding (EUR)) of sending or refraining from sending reminder notifications to the user.

As illustrated, memory jogger component 102 can include interface component 202 (hereinafter referred to as "interface 202") that can receive and/or disseminate, communicate and/or partake in data interchange with a plurality of disparate and diverse sources and/or components. For instance, interface 202 can receive and/or transmit data to, and/or from, a multiplicity of devices or sources, such as, for example, data associated with contextual information gleaned from observation devices 106 and/or information acquired or obtained from personal information manager 108 (e.g., items, events, . . . ). Additionally and/or alternatively, interface 202 can obtain and/or receive data associated with a plethora of other information such as for example, usernames and/or passwords, sets of encryption and/or decryption keys, client applications, services, users, clients, devices, and/or entities involved with a particular transaction, portions of transactions, and thereafter can convey the received or otherwise acquired information to one or more of: cost component 204, attendance predictor 206, priority predictor 208, memory predictor 210, or details predictor 212 for further analysis and/or processing. To facilitate and/or achieve its objectives, interface 202 can provide various adapters, connectors, channels, communication pathways, etc. to integrate the various components included in system 200, and more particularly, memory jogger component 102 into virtually any operating system and/or database system and/or with one another. Additionally and/or alternatively, interface 202 can provide various adapters, connectors, channels, communication modalities, and the like, that can provide for interaction with various components that can comprise system 200, and/or any other component (external and/or internal), data, and the like, associated with system 200.

Memory jogger component 102 can further include cost component 204 that can predict costs of interrupting the user for a given time. Cost component 204 can implement or include both a training aspect and/or an active aspect where during the training aspect busy palette windows can be regularly, periodically or intermittently popped up or displayed. The busy palette windows can ask the user whether they are currently busy. During this training aspect, cost component 204 can also ask the user to enter user-specific cost values for interruptions. These cost-values can represent in monetary terms how much a user is willing to spend or pay to avoid the disruptive effects of notifications. Cost component 204, also continuously, intermittently, automatically, or dynamically, can receive high-level, low-level, and contextual signals about the current state of the user (e.g., from observation devices 106). For instance, low level activities or actions can include whether the user is typing or using the mouse, the user's current focus, and the user's history of activities or actions, for example. High-level activities or actions can include information associated with how frequently the user switches between applications, how many applications are visited, or the time periods during which the user is active or inactive, for instance. Additionally, cost component 204 can collect, acquire, or receive, from one or more other sources or repositories, local or remote, contextual information regarding upcoming items or events (e.g., appointments, meetings, etc.), conversations, and/or discussions that the user is, has been or will be, involved in, or devices utilized.

In relation to the aforementioned training aspect, this aspect can allow users to give feedback in real-time or offline (e.g., to a log of emitted reminders persisted and/or associated with memory jogger component 102) about whether reminders were missing when needed, or if issued, if the reminder had value or was inappropriate. Additionally and/or alternatively, users can also provide feedback as to the reason why the reminder was valueless or inappropriate, such reasons can include one or more of (1) the item or event had not been forgotten, (2) the wrong amount of detail (e.g., too much or too little) was specified, (3) the item or event was irrelevant, (4) the timing was too early or too late, and/or (5) the reminder was good but was received at a costly time. This feedback can then be utilized to construct and/or extend databases that can be employed in building and/or refining various predictive models that can be utilized by the claimed matter.

With the aforementioned acquired, generated, or derived information, cost component 204 can construct predictive models that can be employed to estimate or infer a state of interruptibility of the user. Cost component 204 by combining a probability distribution of user interruptibility with costs assigned by the user for each state of interruptibility, can determine an Expected Cost of Interruption (ECI). Given that a state of interruptibility can be denoted as, $I_i$, the corresponding costs can be represented as $C(I_i)$ for an observational state E. Accordingly, an Expected Cost of Interruption (ECI) can be determined as the weighted sum over all possible states:

$$ECI = \Sigma_i p(I_i|E) C(I_i) \qquad (10)$$

Figure 5:
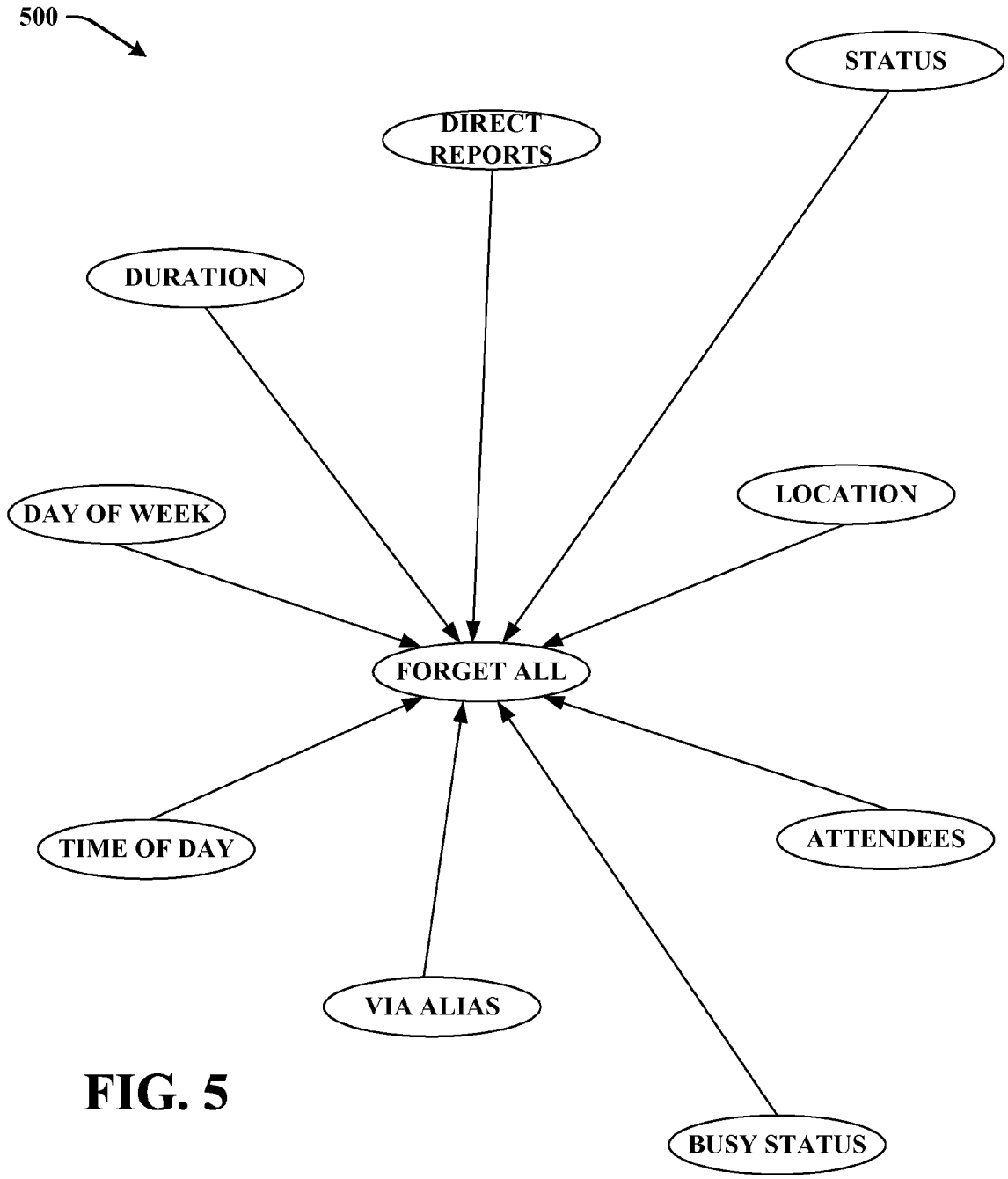
FIG. 5 provides illustration of a personalized Bayesian structure constructed and/or employed in accordance with an aspect of the claimed subject matter.

Using a history of low-level observations, high-level observations, and/or contextual information, cost component 204 can construct or compile a library of cases and apply Bayesian learning modalities/techniques to build a personalized Bayesian structure or network that can be utilized to ascertain a cost of interruption (e.g., see FIG. 5 for an illustrative personalized Bayesian network construct).

Memory jogger component 102 can further include attendance predictor 206 that can predict the probability of a user attending a particular event. Attendance predictor 206 can keep record of, log, tabulate, chronicle, archive, or document all events persisted on or associated with aspects of personal information manager 108 (e.g. calendar events, appointments, ...) as well as other properties that can be manifest and affiliated with those aspects of personal information manager 108 recorded, chronicled, or logged, such as, for example, event time and date, duration, subject, location, organizer of the event, number of invitees, role of the user in relation to the event, identities of other attendees, whether the event is recurrent, and/or marked as busy: Attendance predictor 206 can also incorporate hierarchical relationships of attendees (e.g. from organizational charts). Attendance predictor 206 in accordance with an aspect of the matter disclosed can construct forms that can list events and fields for marking attendance of attendees. The forms established or created by attendance predictor 206 can be completed either according to a basic machine or user initiated heuristic, with assistance from a user, in accordance with some combination of machine or user heuristic, user input, and/or artificial intelligence or machine learning techniques. Completed forms can thereafter be employed by attendance component 206 to build an individuated Bayesian network or structure that can be utilized by system 200 to predict the probability of attendance.

Memory jogger component 102 can further include priority predictor 208 that can be employed to classify events according to priority (e.g., high, medium, low). Priority predictor 208 in accordance with an aspect of the claimed subject matter can develop a form that can have event attributes with affiliated fields for labeling if an event has an objective (e.g., from the perspective of the organization or other participants invited or attending the event) and/or subjective (e.g., from the perspective of the individual user) priority. The developed form typically can be completed by individual users, but machine learning, artificial intelligence, and/or machine or user developed heuristics can also be implemented with equal effect and applicability. Priority predictor 208 can utilize the data included in these forums to generate Bayesian networks for predicting or prognosticating priority values.

Typically, a reminder is only useful provided it refreshes users' memory about something that has been forgotten. Generally, very important events or items do not require reminders to be generated and sent. Otherwise, provided that the user remembers that an event or item is to occur or details associated with the item or event (e.g., time, location, etc.) that is all that is typically required to refresh a user's memory. Thus, memory jogger component 102 utilizes this observation to model those aspects that individuals typically forget. Accordingly, memory jogger component 102 utilizes memory predictor 210 and details predictor 212 to predict whether or not a user remembers that there is an approaching event and to check to see whether the user remembers the important and/or pertinent details regarding the event or item (e.g., location, subject, or date and time of the event or item).

Memory predictor 210 and/or details predictor 212 can employ supervised learning to predict the memory status of a user. For example, memory predictor 210 and/or details predictor 212 can develop, construct, and/or utilize forms that allow users to enter values for particular memory states. Typically, the forms developed, constructed, and/or employed, for example, can include, lists of events sorted in order of occurrence with associated fields that can be utilized to enter boolean values for remembering. Through the developed and/or constructed form, users can see how many events they have scheduled on any particular day, previous and future events, and/or time intervals between events. In this manner the user can remember his or her cognitive load for a particular day and annotate the forms accordingly and accurately.

Annotated forms can thereafter be employed by memory predictor 210 and/or details predictor to 212 to produce models that predict the likelihood that the user will forget about the event itself or forget about details of the event. Both memory predictor 210 and/or details predictor 212 can employ similar features for analysis such as, for example, time and date, subject, attendee list, location, organizer, role of the user, whether the event is recurrent or not, whether the event or time has already been indicated as being busy, etc. Hierarchical relationships between the attendees can also be obtained and/or automatically established/constructed and utilized in the prognosticative determination effectuated by memory predictor 210 and/or details predictor 212. Additionally, determination as to whether the attendees, organizers, and/or the location of the event are atypical given the history of other events in the recorded or chronicled past, present, or future, can also be made and utilized.

Memory predictor 210 and/or details predictor 212 can employ the aforementioned gathered information to construct Bayesian structures or networks to predict or infer the probability that the user will forget about the event entirely (e.g., "Forget All"), and/or the probability that the user will forget about details (e.g., "Forget Details") associated with the event (e.g., the user remembers the event itself but nevertheless forgets pertinent details related to the event). Further, memory predictor 210 and/or details predictor 212 can employ the Bayesian construct to produce a decision tree (e.g., see FIG. 6) that can be utilized to isolate and identify key influencing variables as to whether the user forgets about an event or details associated with the event. Some illustrative influencing variables that can be identified and utilized by memory predictor 210 and/or details predictor 212 can include response status, location, time, day of the event, the event's recurrence pattern, the relationship of the user to the event (e.g., organizer, event leader, keynote speaker, etc.), and/or the busy status associated with the event. Other influencing details that can also be employed, especially in connection with details predictor 212, can include whether event details were delivered via a mailing list, for instance.

Figure 3:
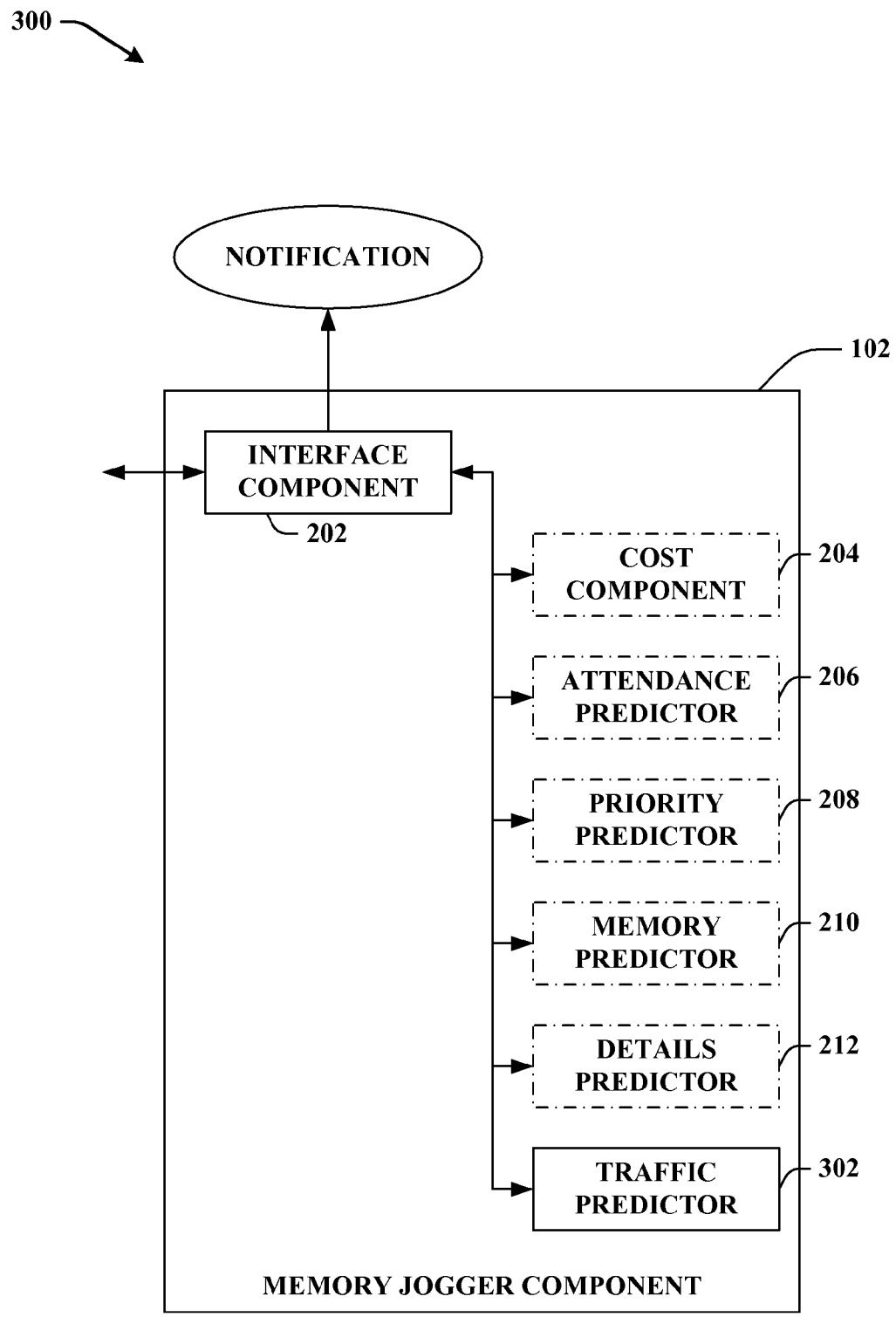
FIG. 3 provides a more detailed illustration of a machine-implemented memory jogger component that establishes and/or employs predictive models of human memory to facilitate and effectuate automated and dynamic reminding in accordance with an aspect of the claimed subject matter.

FIG. 3 provides a further depiction 300 of memory jogger component 102. As illustrated memory jogger component 102 can include all the components and/or aspects elucidated in connection with FIG. 2 (e.g., interface component 202, cost component 204, attendance predictor 206, priority predicted 208, memory predictor 210, and details predictor 212). Because much of the configuration and operation of these components and/or aspects are substantially similar to those presented and detailed in connection with FIG. 2, a detailed description of such features has been omitted to avoid needless repetition and for the sake of brevity and conciseness of exposition. Nevertheless, memory jogger component 102 as illustrated in FIG. 3 can additionally include traffic component 302 that can provide prognostications related to live traffic conditions, traveling routes, and/or traveling durations.

As will be appreciated, recollecting an event, its details and/or attendance at the event can involve aspects other than the event itself and/or its associated detail. An additional aspect that can determine whether or not a user genuinely remembers an event and/or its associated details or conveniently forgets or consciously avoids the event can be current traveling conditions or lengthy travel duration, for example. Accordingly, the matter as claimed and disclosed herein can include traffic predictor 302 that provides live traffic information to be employed in the Expected Utility of Reminding (EUR) determination. Thus, the notifications disseminated and/or distributed by the claimed subject matter can aid users to arrive at events on time by delivering information such as, for example, live traffic predictions, driving directions, route adjustments, estimated time of arrival, and the like.

Traffic predictor 302 can provide context-sensitive traffic predictions based at least in part on current and/or future flows in a traffic system. Traffic predictor 302 can employ incident reports, date and time of day, contextual data including holiday schedules, whether or not school is in session, or whether or not there exists large-scale social events, such as sporting events or music concerts. For a given destination therefore traffic predictor 302 can determine the expected travel time, determine live travel duration ($\Delta t_{live}$) in minutes, for instance, accompanied with an estimate ($\Delta t_{expected}$) under regular traffic conditions. The difference between $\Delta t_{live}$ and $\Delta t_{expected}$ can be employed as being the estimated error in user's prediction for traffic conditions (e.g., $\Delta t = \Delta t_{live} - \Delta t_{expected}$).

The estimated error (or traffic prediction error) can affect the expected time that the user will be late to a given event. For instance, if a road heading to the event is congested due to an accident and the live travel estimate deduced by traffic predictor 302 is 10 minutes more than ordinarily expected, the estimated costs for forgetting details can be commensurately and dynamically or automatically adjusted to reflect this delay (e.g. an extra 10 minutes should be included with the cost for being late). Thus, the raw assumption that a user will always be on time because the user remembers every detail about the event (e.g., remembers that there is an event and the details associated with the event) can often be faulty. Without notification of traffic conditions (e.g., as provided by traffic predictor 302), a user departing in accordance with an expected traffic flow will be late and will arrive at the event 10 minutes late in the foregoing example. Consequently, the claimed matter can employ modified Expected Utility of Reminding (EUR) formulations and/or determinations to take these situations into account and in so doing can utilize the following equivalences:

$$EUR = p(A|E)(p(FA|E)c_{NA} + p(FD|E)C(FD,E) + p(R)C(R,E)) - ECI \quad (11)$$

The cost function for the memory state of forgetting about the details (FD) of an event can be represented by C(FD, E) when t is how many minutes the user is late due to forgetting about the event, and c denotes the minimum cost for being early, and as such the following formulation can be employed by traffic predictor 302:

$$C(FD, E) = \begin{cases} (t + \Delta t)c_{Late} & \text{if } \Delta t > 0 \\ (t + \Delta t)c_{Late} & \text{if } \Delta t \le 0 \text{ and } (t + \Delta t) > 0 \\ (-t + \Delta t)c & \text{if } \Delta t \le 0 \text{ and } (t + \Delta t) \le 0 \end{cases} \quad (12)$$

Moreover, the cost function for remembering about the event can be defined and utilized by traffic predictor 302 as follows. It should nevertheless be noted, without limitation, that the cost function typically corresponds with the value of delivering live traffic predictions to the user.

$$C(R, E) = \begin{cases} \Delta t c_{late} & \text{if } \Delta t > 0 \\ (-\Delta t)c & \text{otherwise} \end{cases} \quad (13)$$

Figure 4:
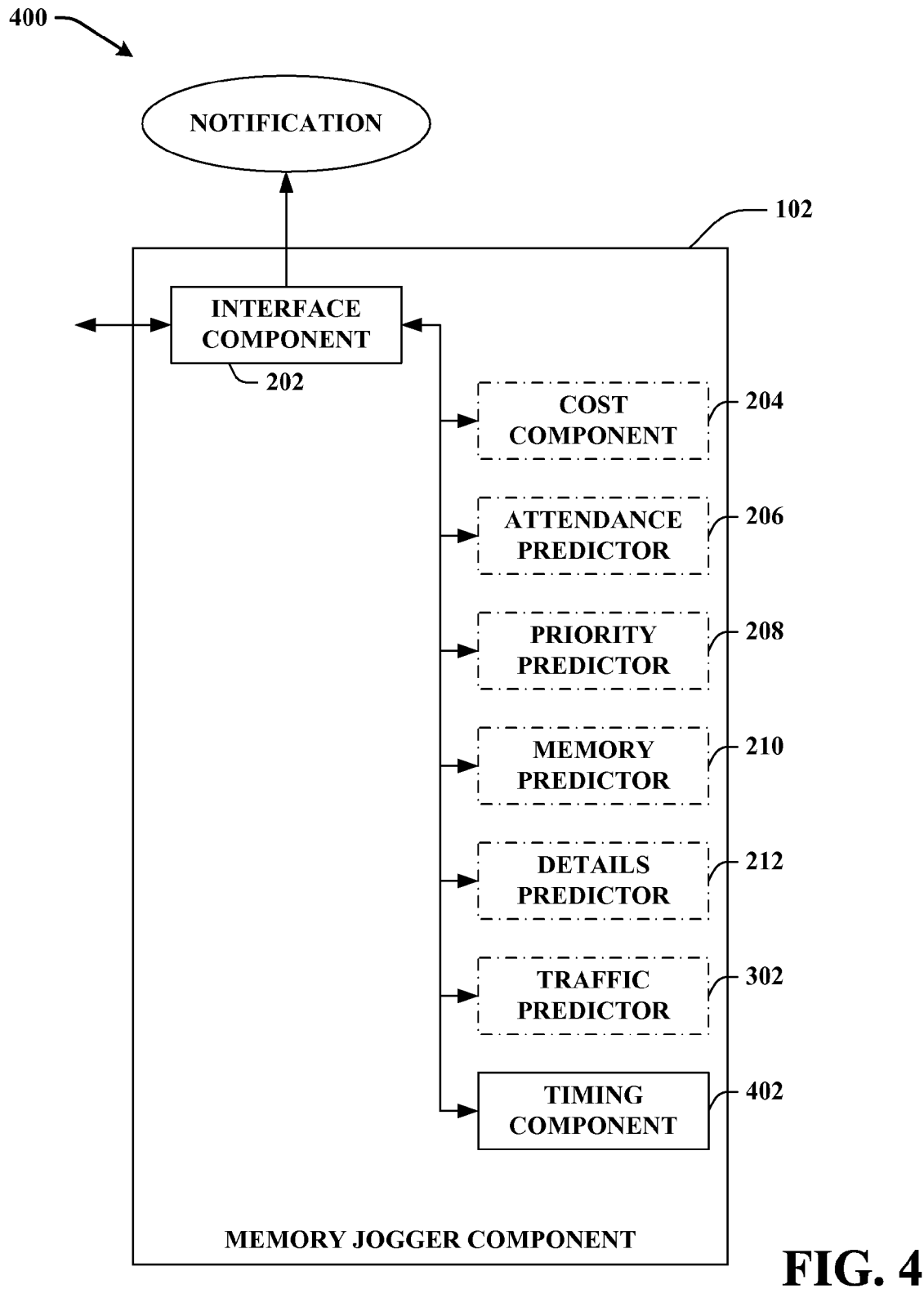
FIG. 4 provides yet a further detailed illustration of a machine-implemented memory jogger component that builds and/or utilizes predictive models of human memory to facilitate and/or effectuate automated and/or dynamic reminding in accordance with an aspect of the claimed subject matter.

FIG. 4 provides yet a further illustration 400 of memory jogger component 102. Once again as illustrated, memory jogger component 102 can include all the components and/or aspects elucidated in connection with FIGS. 2 and 3 (e.g., interface component 202, cost component 204, attendance predictor 206, priority predicted 208, memory predictor 210, details predictor 212, and traffic predictor 302). Since much of the configuration and operation of these components and/or aspects are substantially similar to those presented and recited in connection with FIGS. 2 and 3, a detailed description of such features has been omitted to avoid needless repetition and for the sake of brevity and conciseness of exposition. Nevertheless, memory jogger component 102, as illustrated in FIG. 4, can additionally include timing component 402 that can synchronize distribution or dissemination of reminder notifications to maximize the benefits users can obtain from utilization of reminder systems.

Thus, timing component 402 distributes and/or disseminates reminder notifications to user in a concordant manner so as to maximize the benefit that users can receive from employing the claimed subject matter. The Expected Utility of Reminding (EUR) can change in time as Expected Cost of Interruption (ECI) changes. For example, a user talking on the phone may not be able to receive a notification, but can nevertheless benefit from receiving the notification on completion of his or her phone conversation. In order to attain this objective, the claimed subject matter through timing component 402 can search to find, without limitation, moments that satisfy one or more of the following conditions: that Expected Utility of Reminding (EUR) is positive; the user has sufficient time to get to the event location after receiving reminder notifications; or the timing of the reminder is as close to the expected departure time as possible so that the user's memory about the event is kept fresh until departure time.

Timing component 402 can predict the duration of travel (T(t)) to an event location given the departure time t, inclusive in the departure time t can be the time required for the user to leave from a current location, get to a mode of transportation (e.g., public transportation, automobile, . . . ) and start the trip ($\Delta t_s$) and the time necessary to leave the mode of transportation (e.g., park the automobile, or egress from the public transportation system, etc.) and arrive at the exact destination ($\Delta t_e$). For the sake of exposition rather than limitation, the optimal time to commence the trip can be denoted as t* (e.g. the latest time t that satisfies $t_m - \Delta t_e - T(t) - t \geq 0$). Similarly, the latest time that the user can be reminded so that the user can arrive at the event on time is $t_{max} = t_m - \Delta t_s - \Delta t_e - T(t-t_s)$. Moreover, where the user does not receive live predictions of travel duration, the expected departure time can be represented as: $t_{expected} = t_m - \Delta t_{expected} - \Delta t_s - \Delta t_e$.

In view of the foregoing, timing component 402 should consider at least the following two cases in order to time the dissemination of reminder notifications appropriately. Where the expected travel duration is higher than the live estimate, the user should be reminded before $t_{expected}$ so that the user can postpone departure time to t*. The user can be reminded by timing component 402 at the nearest time (t) to $t_{expected}$ that satisfies EUR(t)>0. The user thus is given the live estimate and the recommended departure time t*. Where the live estimate is higher than the expected travel duration, the user should be recommended to leave earlier than $t_{expected}$ in order to be on time. The user can be reminded by timing component 402 at the nearest time t to $t_{max}$ that satisfies EUR(t)>0 and recommended to depart at t*.

Further, timing component 402 can schedule reminders so that the Expected Utility of Reminding (EUR) values are maximized. For example, the user may prefer to be reminded a few minutes earlier than $t_{max}$ where the Expected Utility of Reminding (EUR) value improves significantly. Nevertheless, the time that maximizes the Expected Utility of Reminding (EUR) may not be the optimal time to remind the user as the user will be more likely to forget again especially where the time between sending the reminder and t increases. As will have been observed there can be different moments in time in terms of the Expected Utility of Reminding (EUR) values and the probability of forgetting again can be determinant of the time for reminder $t_r$. Accordingly, the utility of a reminder at time t can be combined with a discounting factor that typically is inversely proportional to (t*−t). Therefore, time for reminder $t_r$ can be determined by timing component 402 based at least in part on discounted Expected Utility of Reminding ($EUR_d$) values formulated as follows, where c represents a constant that controls how the utility of a reminder falls as (t*−t) increases.

$$EUR_d(t) = e^{c(t-t^*)} EUR(t) \quad (14)$$

$$t_r = \max_t \{e^{c(t-t^*)} EUR(t) : EUR(t) > 0, t^* > t\} \quad (15)$$

FIG. 5 exemplifies an illustrative personalized Bayesian structure 500 utilized to model and/or predict whether or not a user has or will forget completely about an event. Typically, the illustrated personalized Bayesian network 500 can be constructed from data annotated by a user from previous calendar items and events. It should be noted, and as will be appreciated by those cognizant in the art, that only a small fraction of the personalize Bayesian structure 500 has been depicted and that in actuality the network 500 would include many more vertices and/or edges.

Figure 6:
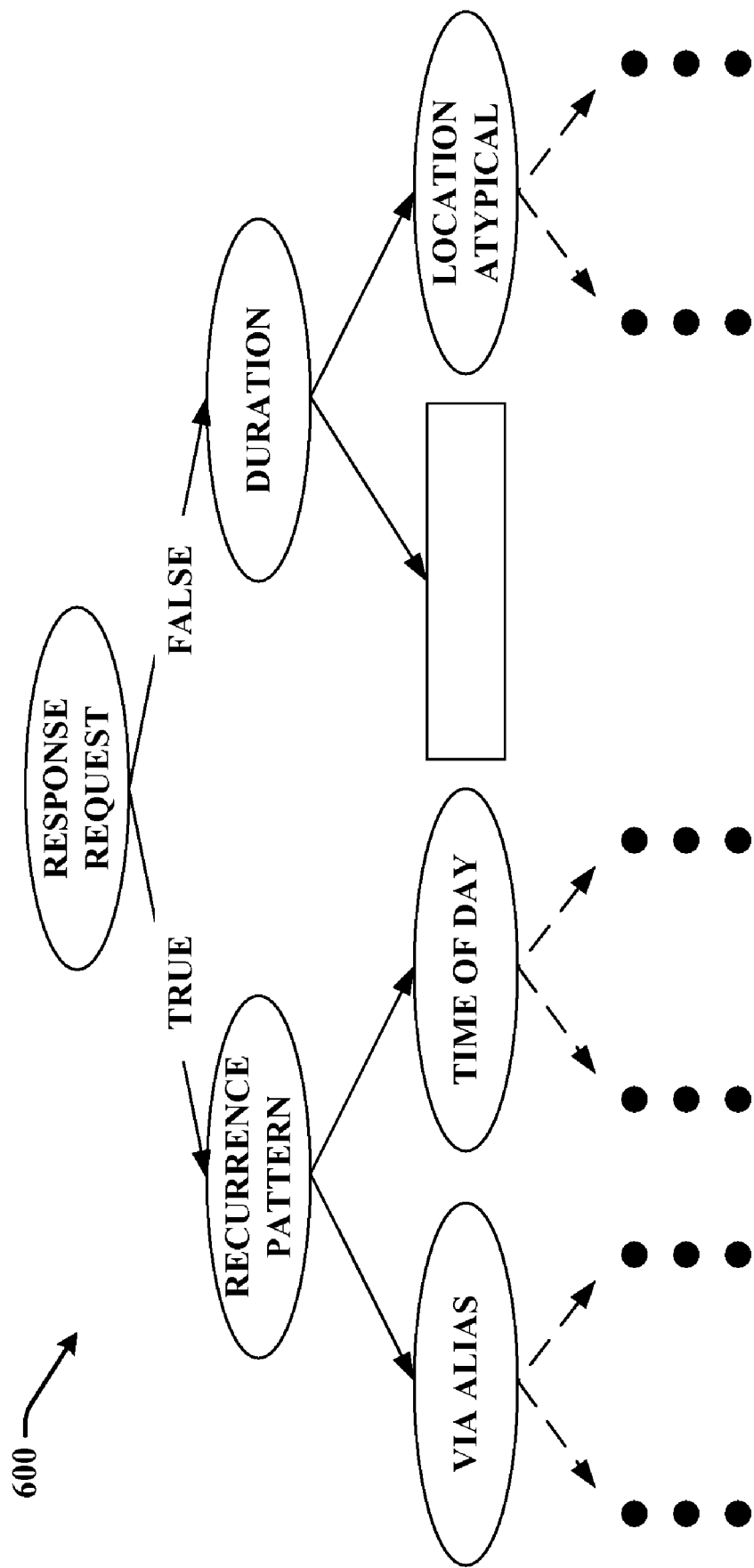
FIG. 6 depicts an illustrative hierarchical construct established and/or utilized in accordance with an aspect of the subject matter as claimed.

FIG. 6 depicts an illustrative hierarchical structure 600 that can be employed as a decision tree to model and prognosticate upon whether a user will or will not forget completely about an event. Generally, such a hierarchical structure 600 can be constructed from raw user annotated data related to previous calendar events and/or items, and/or can be developed from a previously constructed Bayesian structure such as that depicted in FIG. 5. Only a small fraction of the hierarchical structure 600 has been represented in FIG. 6 and as will be readily appreciated by those skilled in this undertaking, hierarchical structure 600 can be many multiple layers and/or levels deep and wide.

Figure 7:
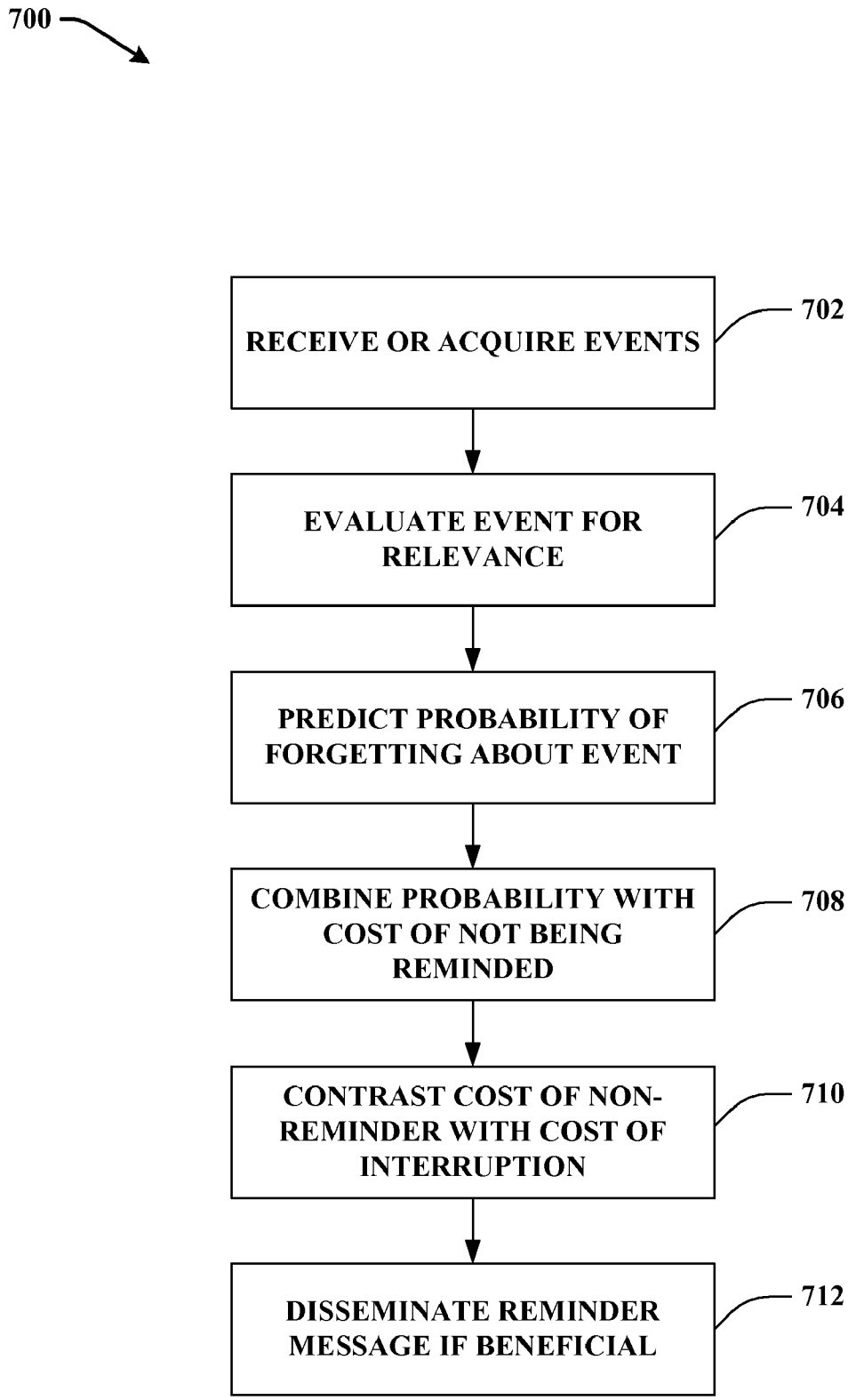
FIG. 7 illustrates a flow diagram of a machine implemented methodology that establishes and/or utilizes predictive models of human memory to facilitate and/or effectuate automated reminding in accordance with an aspect of the claimed subject matter.

In view of the illustrative systems shown and described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 illustrates a machine implemented methodology 700 that constructs and utilizes predictive models of human memory to facilitate and effectuate automated reminding in accordance with an aspect of the claimed subject matter. Method 700 can commence at 702 where events or items from a personal information management source can be passively or actively acquired or received. At 704 each event or item received or acquired can be evaluated for relevance by using a user's self assessments about the event and sentiments with respect to attending the event or regarding the item. At 706 the methodology can use contextual information and attributes associated with the item or approaching event to predict the probability that the user will forget about the event or item. At 708 the predicted probability that the user will forget about the event or item can be combined with a determined cost of not being reminded about the item or event. At 710 a comparison can be made with respect to the cost of non-reminder (e.g., the cost of not being reminded about an event or item) and a determined cost of interruption (e.g., Expected Cost of Interruption (ECI)). Based at least in part on the comparison effectuated and carried out at 710 and where it is found to be beneficial to interrupt the user, at 712 reminder messages and/or notifications can be disseminated or delivered to recipients, for example, via email.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Machine learning and reasoning systems, including those that use explicitly and/or implicitly trained statistical classifiers can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, non-linear classification methodologies, including methods referred to as neural network methodologies, Bayesian belief networks and other probabilistic graphical models, and other methods including the use of association rules mined from databases, etc.) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
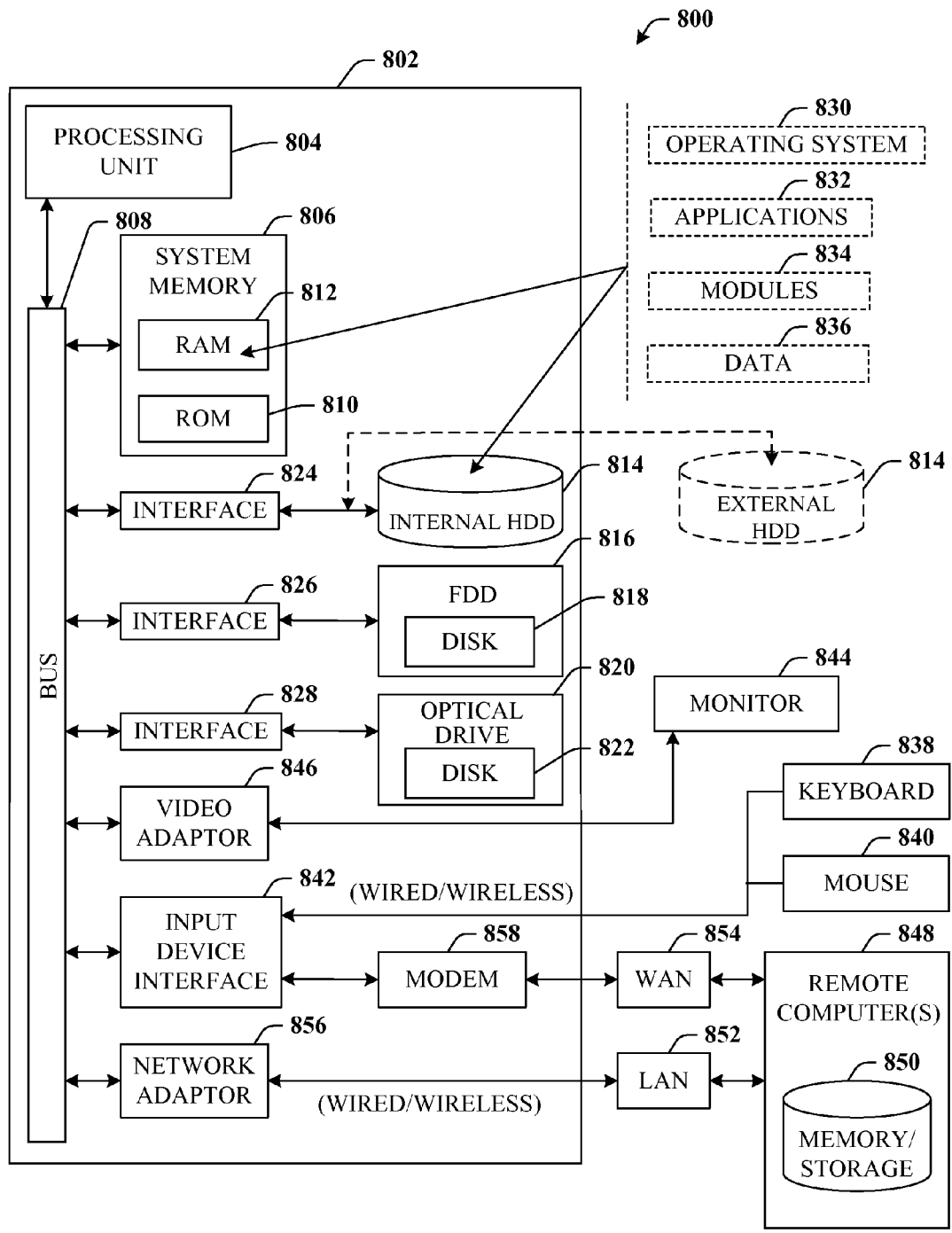
FIG. 8 illustrates a block diagram of a computer operable to execute the disclosed system in accordance with an aspect of the claimed subject matter.

Referring now to FIG. 8, there is illustrated a block diagram of a computer operable to execute the disclosed system. In order to provide additional context for various aspects thereof, FIG. 8 and the following discussion are intended to provide a brief, general description of a suitable computing environment 800 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the illustrative environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the claimed subject matter can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1094 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are illustrative and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 9:
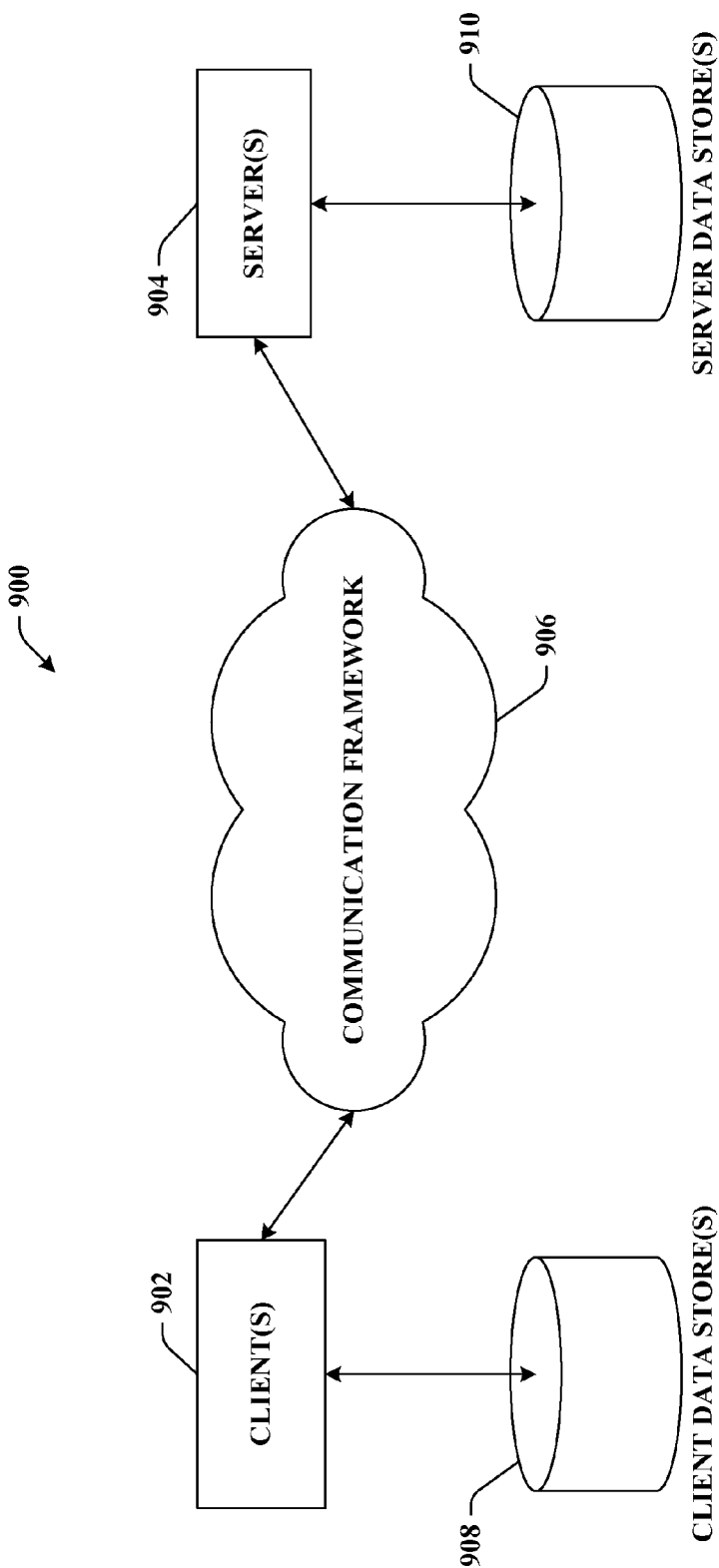
FIG. 9 illustrates a schematic block diagram of an illustrative computing environment for processing the disclosed architecture in accordance with another aspect.

Referring now to FIG. 9, there is illustrated a schematic block diagram of an illustrative computing environment 900 for processing the disclosed architecture in accordance with another aspect. The system 900 includes one or more client(s) 902. The client(s) 902 can be hardware and/or software (e.g., threads, processes, computing devices). The client(s) 902 can house cookie(s) and/or associated contextual information by employing the claimed subject matter, for example.

The system 900 also includes one or more server(s) 904. The server(s) 904 can also be hardware and/or software (e.g., threads, processes, computing devices). The servers 904 can house threads to perform transformations by employing the claimed subject matter, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that develops or utilizes predictive models of human memory to effectuate or facilitate automated reminding, comprising:

a component that acquires an event or other item via an interface, the component evaluates the event or other item for relevance based at least in part on a predictive model for the relevance of the event or other item based on contextual information or attributes associated with the event or other item, the component also infers a probability of the user forgetting about the event or other item, combines the probability of the user forgetting about the event or other item with a user specific cost of forgetting to ascertain an expected cost for not being reminded, the component compares the expected cost for not being reminded with an expected cost for interrupting the user, based at least in part on the comparison between the expected cost for being reminded and the expected cost for interrupting the user the component generates and delivers a reminder notification to the user.

2. The system of claim 1, the user assessment of the event or other item based at least in part on a user evaluated cost that includes a monetary valuation that the user assigns to avoiding a disruptive effect associated with receiving a reminder notification.

3. The system of claim 1, the component at least one of continuously or intermittently receives contextual evidence regarding a current state affiliated with the user.

4. The system of claim 3, where evidence about a user's state includes user application context switches, user dwell periods within an application, periods of user activity, utilization of a mouse, a keyboard, or a history of the user's computational activity or inactivity.

5. The system of claim 3, where evidence includes a user's location, velocity, or proximity to people, resources, or structures.

6. The system of claim 3, the evidence about state including data associated with one or more events or items, the one or more events or items including appointments, conversations, discussions that the user is one or more of currently involved in, will be involved in, or has been involved in, or devices utilized by the user in one or more of taking part in the one or more events, has been employed to take part in the one or more events, or will be employed to take part in the one or more events.

7. The system of claim 1, the component determines an expected cost of interruption (ECI) based at least in part on a combination of a probability distribution of user interruptibility with costs assigned by a user for each state of interruptibility.

8. The system of claim 1, the component categorizes events into one or more priority levels based at least in part on a probabilistic model.

9. The system of claim 1, the component based at least in part on a history of high-level observations, low-level observations, or contextual information establishes a library of cases or applies Bayesian or other statistical machine learning techniques to construct a personalized predictive model that infers the cost of interrupting the user in a context.

10. The system of claim 1, the component predicts a probability of the relevance of an item or event, or surrogate for relevance that includes the probability that a user will attend an event based at least in part on properties of the item that includes one or more of the event time or date, duration, location, subject, number of invitees, or a repetition schedule associated with the event.

11. The system of claim 10, the component further predicts the probability of the user attending the event based on one or more hierarchical relationships associated with an invitee to the event or the organizer of the event, the one or more hierarchical relationships dynamically established by the component.

12. The system of claim 1, component based at least in part on the comparison between the cost for being reminded and the cost for interrupting the user generates a prognosis associated with live traffic conditions, travel routes, or travel duration associated with attending the event.

13. A machine implemented method that develops or utilizes predictive models of human forgetting and/or remembering to effectuate or facilitate automated reminding, comprising:
    evaluating an item for relevance based on a user assessment of the item, contextual information associated with the user, or attributes associated with the item;
    predicting a probability of the user forgetting about the item;
    aggregating the probability of the user forgetting about the item with a user specific cost to ascertain a cost for not being reminded about the item;
    contrasting the cost for not being reminded about the item with a cost for interrupting the user about the item; and
    based at least in part on the contrasting, disseminating a reminder notification about the item to the user.

14. The method of claim 13, further comprising persisting feedback from the user and recorded in at least one of real-time or offline about whether the reminder notification was at least one of missing when needed, valuable, or inappropriate, where the reminder notification is indicated as at least one of valuable or inappropriate further soliciting from the user a reason that can include one or more of the item was not forgotten, too little detail was disseminated with the reminder notification, too much detail was associated with the reminder notification, the item was irrelevant to the user, or timing of receipt of the reminder notification was inappropriate.

15. The method of claim 13, further comprising determining an appropriate time to interrupt the user and based on the appropriate time for disseminating the reminder notification about the item to the user.

16. The method of claim 13, further comprising utilizing one or more of live traffic conditions, determined travel routes, or expected travel durations to determine an appropriate time to interrupt the user and based at least in part on the appropriate time, disseminating the reminder notification about the item to the user, the reminder notification including a proposed departure time, a latest departure time, the determined travel routes, or the expected travel duration.

17. The method of claim 13, further comprising determining a probability of the user attending an event, the probability of the user attending the event based on an event time or date, an event duration, a repetition cycle associated with the event, a unique location associated with the event, or an involvement the user has with the event.

18. A system that utilizes predictive models of human memory to effectuate automated reminding, comprising:
    means for assessing an event for relevance based on a user assessment of the item, contextual information associated with the user, or attributes associated with the item;
    means for inferring a probability of the user forgetting about one or more aspects of the item;
    means for combining the probability of the user forgetting about the item with a user specific cost to ascertain a cost for not being reminded about one or more aspects of the item;
    means for contrasting the cost for not being reminded about one or more aspects of the item with a cost for interrupting the user about the event; and
    means for disseminating a reminder notification about the event to the user.

19. The system of claim 18, further comprising means for obtaining a user evaluated cost associated with the item, the user evaluated cost includes an avoidance cost that the user assigns to the item.

20. The system of claim 18, further comprising means for timing the reminder notification based at least in part on a means for determining live traffic conditions, the means for determining live traffic conditions provides dynamic travel route updates, or an expected travel duration, the expected travel duration utilized by the means for disseminating to disseminate the reminder notification.

* * * * *

UNITED STATES PATENT AND TRADEMARK OFFICE
CERTIFICATE OF CORRECTION

PATENT NO. : 7,996,338 B2  
APPLICATION NO. : 12/163045  
DATED : August 9, 2011  
INVENTOR(S) : Semiha Ece Kamar et al.

Page 1 of 1

It is certified that error appears in the above-identified patent and that said Letters Patent is hereby corrected as shown below:

On the Title Page, item (73),
change "Mircrosoft" to --Microsoft--.

Signed and Sealed this
Twentieth Day of December, 2011

David J. Kappos
*Director of the United States Patent and Trademark Office*

UNITED STATES PATENT AND TRADEMARK OFFICE
CERTIFICATE OF CORRECTION

PATENT NO. : 7,996,338 B2
APPLICATION NO. : 12/163045
DATED : August 9, 2011
INVENTOR(S) : Semiha Ece Kamar et al.

Page 1 of 1

It is certified that error appears in the above-identified patent and that said Letters Patent is hereby corrected as shown below:

In column 6, Line 14-49, delete $$U_R(FD) = (p(A \mid E)(U_{OnTime} - U_{Late})) - ECI \quad (3)$$
$$= (p(A \mid E)(-c_{Late}t)) - ECI \quad (4)$$

where $$c_{Late} = p(m^H)c_{Late}^H + p(m^M)c_{Late}^M + p(m^L)c_{Late}^L \quad (5)$$

Where the user has forgotten entirely about the event (e.g., is in the "Forget All" state), the user will typically miss the whole event and the estimated utility of being reminded can be represented as: $U_{NA}$=−Cost$_{NA}$ $$U_R(FA) = (p(A \mid E)(U_{OnTime} - U_{NA})) - ECI$$
$$= (p(A \mid E)(-c_{NA})) - ECI$$

where $$c_{NA} = p(m^H)c_{NA}^H + p(m^M)c_{NA}^M + p(m^L)c_{NA}^L$$

Accordingly, the Expected Utility of Reminding (EUR) can be represented by:

$$EUR = p(A \mid E)(p(FA \mid E)c_{NA} + p(FD \mid E)c_{Late}t) - ECI$$

It should be noted in regard to the above formulations that ECI refers to the Expected Cost of Interruption (ECI).

Turning now to FIG. 1 that depicts a system 100 that utilizes predictive models of human memory to facilitate and effectuate automated reminding in accordance with an aspect of the claimed subject matter. As a preliminary but extremely cursory overview, system 100 can acquire or receive impending or approaching events or items gleaned, for example, from a personal information manager and thereafter can evaluate the incoming events or items for relevance through use of a user's self assessments about event attendance, for instance. Through utilization of contextual information and attributes associated with" and insert the same on col. 5, Line 32 below "$U_{Late}$=−Cost$_{Late}$".

Signed and Sealed this
Tenth Day of April, 2012

David J. Kappos
*Director of the United States Patent and Trademark Office*